United States Patent
Lee et al.

(10) Patent No.: US 10,319,980 B2
(45) Date of Patent: Jun. 11, 2019

(54) BATTERY PACK

(71) Applicant: LG CHEM, LTD., Seoul (KR)

(72) Inventors: Chul Kyu Lee, Daejeon (KR); Seung Ryul Choi, Daejeon (KR); Jun Park, Daejeon (KR); Kyung Hyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 78 days.

(21) Appl. No.: 15/559,905

(22) PCT Filed: Jul. 26, 2016

(86) PCT No.: PCT/KR2016/008166
§ 371 (c)(1),
(2) Date: Sep. 20, 2017

(87) PCT Pub. No.: WO2017/043764
PCT Pub. Date: Mar. 16, 2017

(65) Prior Publication Data
US 2018/0076439 A1  Mar. 15, 2018

(30) Foreign Application Priority Data
Sep. 10, 2015  (KR) .......... 10-2015-0128545

(51) Int. Cl.
H01M 2/34 (2006.01)
H01M 2/10 (2006.01)

(52) U.S. Cl.
CPC ............ *H01M 2/345* (2013.01); *H01M 2/10* (2013.01); *H01M 2/1022* (2013.01); *H01M 2/1072* (2013.01); *H01M 2/34* (2013.01); *H01M 2/348* (2013.01); *H01M 2200/103* (2013.01); *H01M 2200/20* (2013.01)

(58) Field of Classification Search
None
See application file for complete search history.

(56) References Cited

U.S. PATENT DOCUMENTS

| | | |
|---|---|---|
| 2007/0054157 A1 | 3/2007 | Ryu et al. |
| 2011/0039147 A1 | 2/2011 | Cheon et al. |
| 2014/0127549 A1 | 5/2014 | Roh et al. |
| 2015/0044528 A1 | 2/2015 | Yang et al. |

FOREIGN PATENT DOCUMENTS

| | | |
|---|---|---|
| EP | 2 284 929 A1 | 2/2011 |
| JP | 10-208726 A | 8/1998 |
| KR | 20-1998-0032811 U | 9/1998 |
| KR | 10-2007-0028228 A | 3/2007 |
| KR | 10-0764618 B1 | 10/2007 |
| KR | 10-1072955 B1 | 10/2011 |
| KR | 10-2013-0012354 A | 2/2013 |
| KR | 10-2014-0042269 A | 4/2014 |
| KR | 10-2014-0135054 A | 11/2014 |

OTHER PUBLICATIONS

International Search Report for PCT/KR2016/008166 (PCT/ISA/210) dated Oct. 27, 2016.
European Search Report for Appl. No. 16844584.9 dated Jun. 1, 2018.

*Primary Examiner* — Ladan Mohaddes
(74) *Attorney, Agent, or Firm* — Birch, Stewart, Kolasch & Birch, LLP

(57) ABSTRACT

The present invention relates to a battery pack connected to an electronic device. The battery pack comprises: a battery module provided with a plurality of battery cells which are disposed adjacent to each other and connected to each other in series and on which first and second electrode terminals are disposed; a fuse disposed between the first electrode terminal of the uppermost battery cell and the second electrode terminal of the electronic device; and a switching device provided with a first plate disposed on a top surface of the uppermost battery cell and connected to the first electrode terminal of the uppermost battery cell, a second plate disposed above the first plate and connected to the second electrode terminal of the lowermost battery cell, and a support frame disposed between the first plate and the second plate and having fragility.

5 Claims, 7 Drawing Sheets

BATTERY PACK

TECHNICAL FIELD

Cross-Reference to Related Application

The present application claims the benefit of the priority of Korean Patent Application No. 10-2015-0128545, filed on Sep. 10, 2015, which is hereby incorporated by reference in its entirety.

Technical Field

The present invention relates to a battery pack, and more particularly, to a battery pack that cuts off power supplied to a battery module when the battery module is overcharged and short-circuited to the outside to prevent the battery module from being exploded or ignited.

BACKGROUND ART

In general, rechargeable batteries may be chargeable and dischargeable batteries, unlike primary batteries that are impossible to charge.

Such rechargeable batteries comprise low-capacity battery packs that are used for portable small electronic devices and high-capacity battery packs that are used for power sources for driving motors of hybrid vehicles.

DISCLOSURE OF THE INVENTION

Technical Problem

The battery pack according to the related art comprises a battery module in which a plurality of battery cells are connected in series and a battery case in which the battery module is built.

However, the battery pack according to the related art has a problem that a battery module abnormally swells or generates high-temperature heat when short-circuit occurs due to overcharging or an external impact. Particularly, the explosion and the ignition may occur due to the swelling and the high-temperature heat of the battery module.

The present invention has been made to solve the abovementioned problem, and an object of the present invention is to provide a battery pack that cuts off power supplied to a battery module when the battery module is overcharged and short-circuited by an external impact to prevent the battery module from being exploded or ignited.

Technical Solution

To achieve the abovementioned object, a battery pack connected to an electronic device comprises: a battery module provided with a plurality of battery cells which are disposed adjacent to each other and connected to each other in series and on which first and second electrode terminals are disposed, wherein the first electrode terminal of the uppermost battery cell is connected to a second electrode terminal of the electronic device, and the second electrode terminal of the lowermost battery cell is connected to a first electrode terminal of the electronic device; a fuse disposed between the first electrode terminal of the uppermost battery cell and the second electrode terminal of the electronic device; and a switching device provided with a first plate disposed on a top surface of the uppermost battery cell and connected to the first electrode terminal of the uppermost battery cell, a second plate disposed above the first plate and connected to the second electrode terminal of the lowermost battery cell, and a support frame disposed between the first plate and the second plate and having fragility, wherein, when the battery cell swells, the first plate deformed together with the battery cell breaks the support frame having the fragility to come into contact with the second plate, and the fuse is broken by high-temperature heat generated by connecting the first electrode terminal of the uppermost battery cell to the second electrode terminal of the lowermost battery cell to disconnect the electronic device from the uppermost battery cell.

The support frame may comprise a support framework disposed between the first plate and the second plate, a plurality of horizontal support bars coupled to the inside of the support framework in a horizontal direction, and a plurality of vertical support bars coupled to top surfaces of the horizontal support bars in a vertical direction, and the horizontal support bars and the vertical support bars may be broken by pressing the first plate that is deformed when the battery cell swells.

The support frame may be made of a synthetic resin having the fragility.

The support frame may have a connection hole in a surface thereof on which the horizontal support bars and the vertical support bars cross each other.

Each of the first plate and second plates may be made of copper (Cu).

Advantageous Effects

The present invention has effects as follows.

First: the battery pack comprising the fuse and the switching device may be provided to cut off the current supply when the short-circuit occurs due to the overcharging or the external impact and thereby to prevent additional current and heat from being accumulated, thereby preventing the battery from being exploded or ignited.

Second: the switching device may be provided with the first and second plates and the support frame between the first and second plates. Since the support frame is made of the material having the fragility, when the normal charging is performed, the support frame may space the first and second plates from each other, and when the abnormal overcharging occurs, the support frame may be easily broken by the first plate that is deformed together with the swelling battery cell to connect the first and second plates to each other.

BRIEF DESCRIPTION OF THE DRAWINGS

FIG. 5 is a view illustrating a charged state of the battery module, FIG. 6 is a view illustrating a state in which the switching device is grounded when the overcharging occurs, and FIG. 7 is a view illustrating a state in which a fuse of the battery module is broken.

MODE FOR CARRYING OUT THE INVENTION

Figure 1:
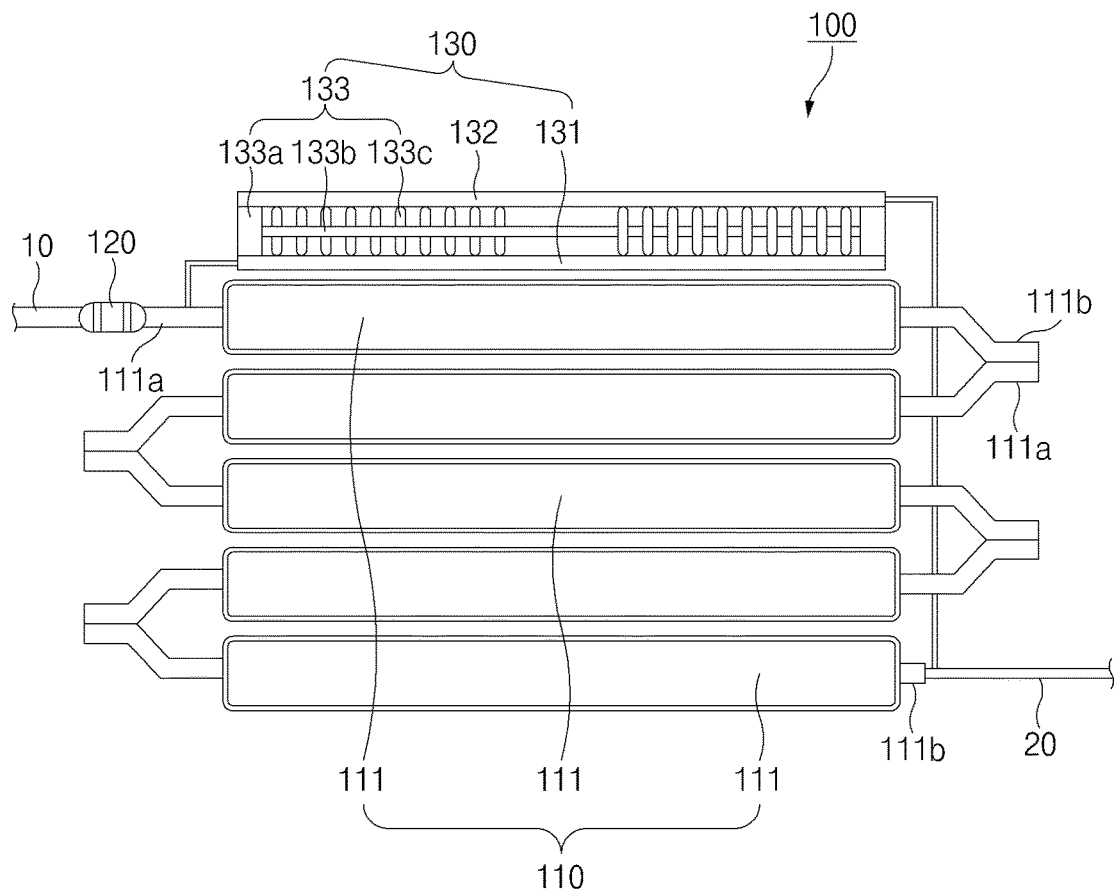
FIG. 1 is a view of a battery module according to the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

As illustrated in FIG. 1, a battery pack 100 according to the present invention has a structure that is used to be connected to an electronic device and prevents a battery cell that abnormally swells when short-circuit occurs due to overcharging or an external impact from being exploded or ignited.

That is, the battery pack 100 according to the present invention comprises a battery module 110 provided with a plurality of battery cells 111, on which a first electrode terminal and a second electrode terminal are disposed, and connected to an electronic device (not shown), a fuse 120 disposed on a connection line between the battery cells 111 and the electronic device, and a switching device 130 generating high-temperature heat so that the fuse 120 is melted and broken when the battery cells 111 abnormally swell.

The battery module 110 is provided with the plurality of battery cells 111. Each of the battery cells 111 comprises an electrode assembly in which a first electrode, a separator, and a second electrode are sequentially stacked and a case accommodating an electrolyte together with the electrode assembly. Also, a first electrode tab and a second electrode tab are disposed on the first electrode and the second electrode, respectively. Also, a first electrode terminal 111a and a second electrode terminal 111b are coupled to the first electrode tab and the second electrode tab, respectively. The first electrode is a positive electrode, and the second electrode is a negative electrode, and vice versa.

That is, the battery module 110 has a series structure in which the plurality of battery cells 111 are disposed adjacent to each other, and the first and second electrode terminals 111a and 111b corresponding to each other of the battery cell 111 are connected to each other. Also, the first electrode terminal 111a of the battery cell 111 that is disposed at the uppermost side (hereinafter, referred to as the uppermost battery cell) is connected to the second electrode terminal (not shown) of the electronic device (for example, a charging device or a mechanical device) through a connection line 10, and the second electrode terminal 111b of the battery cell 111 that is disposed at the lowermost side (hereinafter, referred to as the lowermost battery cell) is connected to the first electrode terminal of the electronic device through a connection line 20.

Here, the electronic device may be a device that operates by power such as a charging/discharging device or a mechanical device.

The battery module 110 may comprise a battery case for stably accommodating the plurality of battery cells 111.

Here, although the battery module 110 having the series connection structure increases in battery performance, overcurrent and high-temperature heat may be easily generated in the battery cell 111 when the short-circuit occurs due to the overcharging or the external impact. Particularly, when the overcurrent and the high-temperature heat are accumulated in the battery cell 111, explosion or ignition may occur.

To solve the above-described problem, the battery pack 100 according to the present invention comprises the fuse 120 and the switching device 130, which disconnect the battery cell 111 from the electronic device when the overcurrent or the high-temperature heat is largely accumulated in the battery cell 111 to prevent the battery cell 111 from being exploded or ignited.

The fuse 120 is configured to disconnect the electronic device from the battery module 110 when the battery pack is overcharged or short-circuited to the outside. The fuse 120 is disposed on the connection line 10 connecting the second electrode terminal of the electronic device to the first electrode terminal 111a of the uppermost battery cell 111. The fuse 120 is a device that automatically cuts off excessive current from flowing and is melted by heat and thus broken.

That is, the fuse 120 is melted by high-temperature heat generated in the connection line 10 connecting the electronic device to the first electrode terminal 111a of the uppermost battery cell 111 and thus is broken. Thus, the electronic device may be disconnected from the battery module 110 to prevent additional current and heat from being accumulated in the battery module 110.

Figure 2:
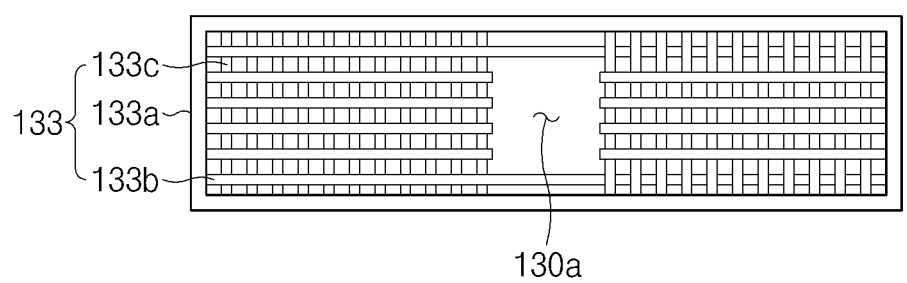
FIG. 2 is a perspective view illustrating a switching device of the battery module according to the present invention.
Figure 3:
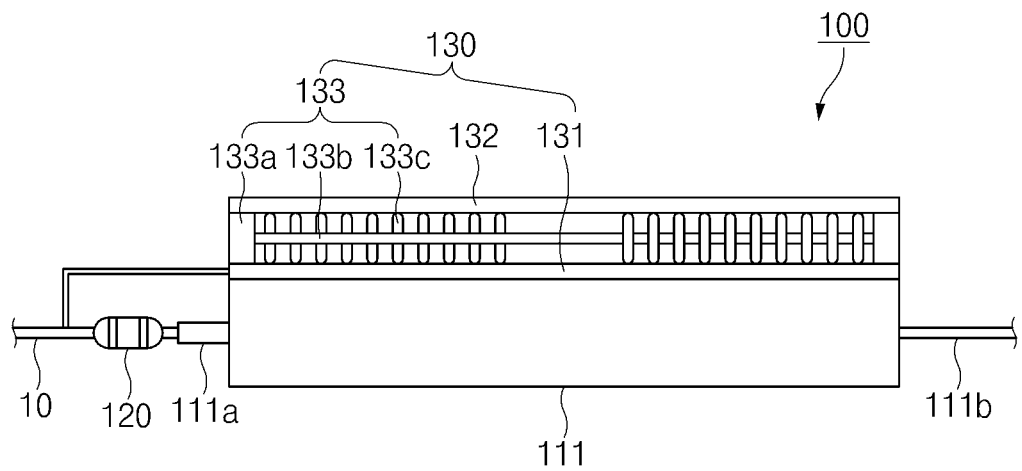
FIG. 3 is a cross-sectional view illustrating the switching device of the battery module according to the present invention.

As illustrated in FIGS. 2 and 3, the switching device 130 generates high-temperature heat through overcurrent generated by connecting the first electrode terminal to the second electrode terminal to break the fuse 120 by using the high-temperature heat.

That is, the switching device 130 comprises a first plate 131 disposed outside the uppermost battery cell 111 and connected to the first electrode terminal 111a of the uppermost battery cell 111 or the connection line 10 connected to the first electrode terminal 111a of the uppermost battery cell 111, a second plate 132 disposed above the first plate 131 and connected to the second electrode terminal 111b of the lowermost battery cell 111 or the connection line 20 connected to the second electrode terminal 111b of the lowermost battery cell 111, and a support frame 133 disposed between the first plate 131 and the second plate 132 to space the first plate from the second plate 132 without coming into contact with each other.

The first plate 131 and the second plate 132 are provided as plates having the same size and thickness, and particularly, made of copper (Cu) to improve conductivity.

The support frame 133 has fragility and is made of a non-conductive synthetic resin. That is, the support frame 133 is made of a material having fragility so that the support frame 133 is easily broken by pressing force of the first plate 131. Thus, the first plate 131 comes into stable contact with the second plate 132 through the support frame 133.

That is, as illustrated in FIGS. 2 and 3, the support frame 133 comprises a support framework 133a disposed between the first plate 131 and the second plate 132, a plurality of horizontal support bars 133b coupled to the inside of the support framework 133a in one direction (a horizontal direction when viewed in FIG. 2), and a plurality of vertical support bars 133c coupled to the inside of the support framework 133a in the other direction (a vertical direction when viewed in FIG. 2).

That is to say, the support framework 133a supports edges of the first plate 131 and the second plate 132, and the horizontal and vertical support bars 133b and 133c prevent the first and second plates 131 and 132 from normally coming into with each other. Here, when the first plate 131 is deformed, the horizontal and vertical support bars 133b and 133c are easily broken by the first plate 131. As a result, the first plate 131 passes through the support frame 133 to come into contact with the second plate 132.

Here, a connection hole 130a is formed in a surface on which the horizontal and vertical support bars 133b and 133c cross each other. The connection hole 130a serves as a passage through which the first and second plates 131 and 132 come into contact with each other even though the horizontal and vertical support bars 133b and 133c are not broken.

Figure 4:
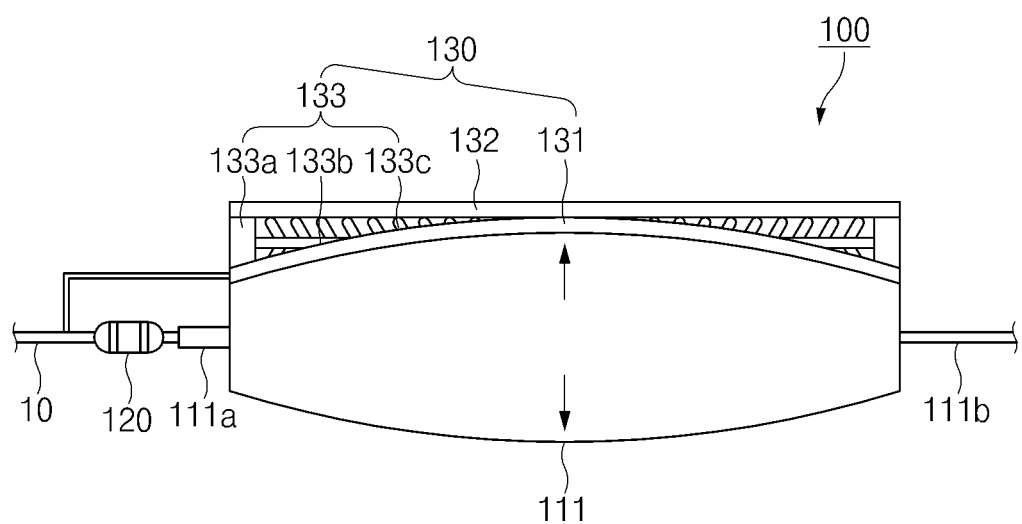
FIG. 4 is a view illustrating a contact state of the switching device when overcharging occurs.

As illustrated in FIG. 4, in the switching device 130, when the overcharging occurs, the first or second plate 131 or 132 may be deformed to break the horizontal and vertical support bars 133b and 133c of the support frame 130, and thus, the first and second plates 131 and 132 may come into contact with each other through a space formed by the breakage of the horizontal and vertical support bars 133b and 133c to generate the high-temperature heat due to the overcurrent.

That is, as illustrated in FIG. 4, the first plate 131 is deformed by the battery cell 111 that swells when the battery module 110 is overcharged, and the deformed first plate 131 breaks the horizontal and vertical support bars 133b and 133c to come into contact with the second plate 132. Thus, the first and second plates 131 and 132 come into contact with each other to generate the high-temperature heat due to the overcurrent generated through the connection between the first electrode terminal 111a of the uppermost battery cell 111 and the second electrode terminal 111b of the lowermost battery cell 111. As a result, the high-temperature heat is transferred to the connection line 10 to break the fuse 120.

A use state of the battery pack comprising the above-described constituents according to the present invention will be described below.

Figure 5:
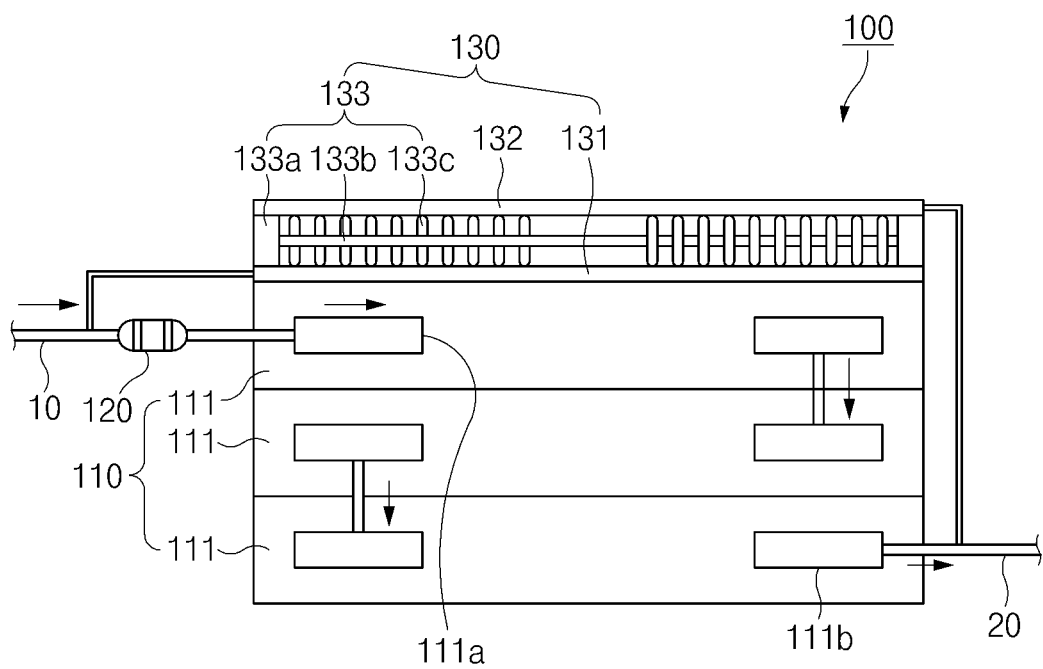
FIGS. 5 to 7 are views illustrating a use state of the battery module according to the present invention.

First, as illustrated in FIG. 5, a prepared battery pack 100 and an electronic device are connected to each other. That is, a plurality of battery cells are connected to each other in series to prepare a battery module 110. Then, in the battery module 110, a first electrode terminal 111 of the uppermost battery cell 111 and a second electrode terminal (not shown) of the electronic device are connected to each other through a connection line 10, and a second electrode terminal 111b of the lowermost battery cell 111 and a first electrode terminal of the electronic device are connected to each other through a connection line 20. When the connection are completed as described above, the electronic device operates.

Figure 6:
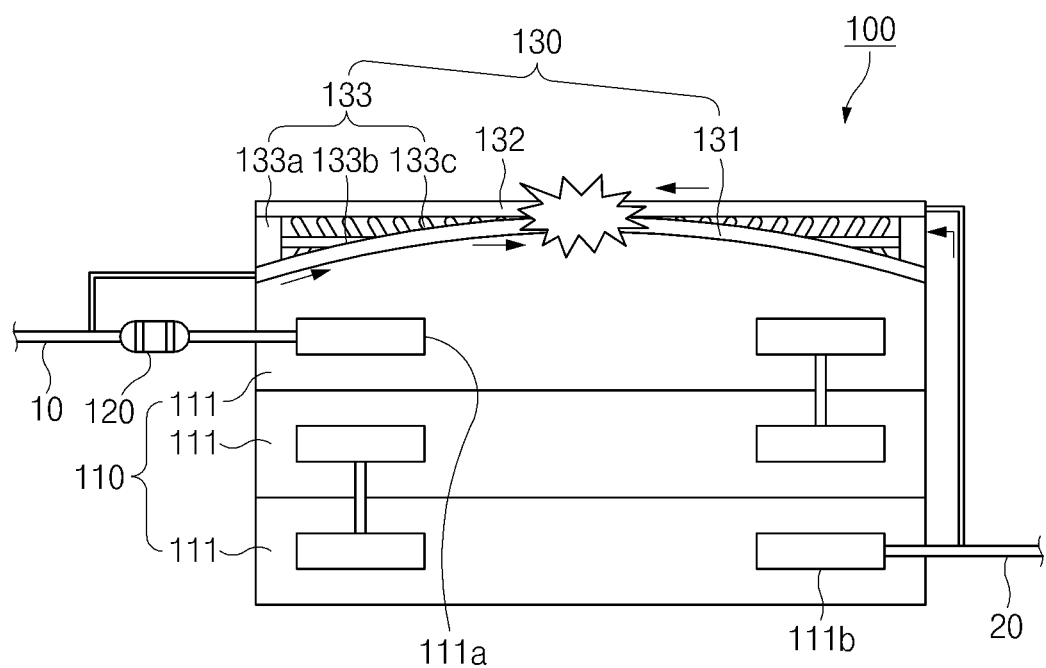

Here, as illustrated in FIG. 6, when the battery module 110 is overcharged, the battery cell 111 swells in volume. Thus, a first plate 131 of a switching device 130 is deformed by the swelling battery cell 111, and the deformed first plate 131 breaks horizontal and vertical support bars 133b and 133c of a support frame 133 to come into contact with a second plate 132.

Figure 7:
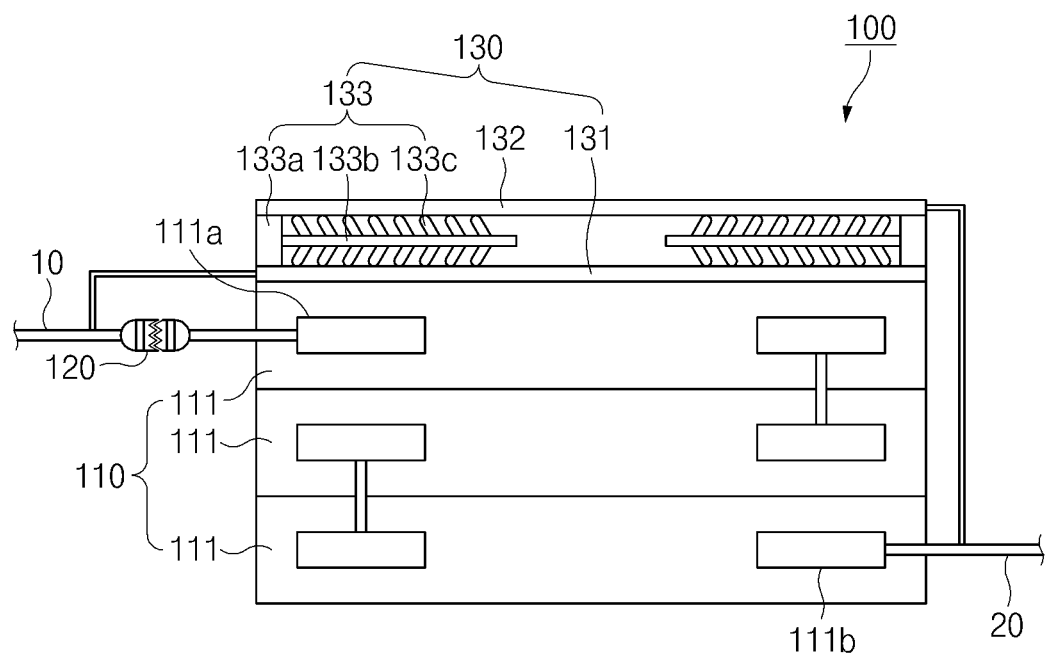

Also, as illustrated in FIG. 7, when the first electrode terminal 111a of the uppermost battery cell 111 is connected to the second electrode terminal 111b of the lowermost battery cell 111, overcurrent flows to generate high-temperature heat. Here, the high-temperature heat is transferred to the connection line 10 connected to the first electrode terminal 111a of the uppermost battery cell 111 to break a fuse 120. As a result, the fuse 120 is broken to prevent additional current or heat from being accumulated in the battery cell 111, thereby preventing the battery cell 111 from being exploded or ignited.

Thus, the battery pack 100 according to the present invention may comprise the switching device 130 and the fuse 120 to prevent the battery module 110 provided with the plurality of battery cells 111 from being exploded and ignited.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A battery pack connected to an electronic device, the battery pack comprising:
    a battery module provided with a plurality of battery cells which are disposed adjacent to each other and connected to each other in series and on which first and second electrode terminals are disposed, wherein a first electrode terminal of an uppermost battery cell of the plurality of battery cells is connected to a second electrode terminal of the electronic device, and a second electrode terminal of a lowermost battery cell of the plurality of battery cells is connected to a first electrode terminal of the electronic device;
    a fuse disposed between the first electrode terminal of the uppermost battery cell and the second electrode terminal of the electronic device; and
    a switching device provided with a first plate disposed on a top surface of the uppermost battery cell and connected to the first electrode terminal of the uppermost battery cell, a second plate disposed above the first plate and connected to the second electrode terminal of the lowermost battery cell, and a support frame disposed between the first plate and the second plate,
    wherein, when the battery cell swells, the first plate deforms to break the support frame to come into contact with the second plate, and
    wherein the fuse is broken by heat generated when the first electrode terminal of the uppermost battery cell is connected to the second electrode terminal of the lowermost battery cell after the first plate contacts the second plate to disconnect the electronic device from the uppermost battery cell.

2. The battery pack of claim 1, wherein the support frame comprises a support framework disposed between the first plate and the second plate, a plurality of horizontal support bars coupled to the inside of the support framework in a horizontal direction, and a plurality of vertical support bars coupled to top surfaces of the horizontal support bars in a vertical direction, and
    the horizontal support bars and the vertical support bars are broken by pressing the first plate that is deformed when the battery cell swells.

3. The battery pack of claim 1, wherein the support frame is made of a synthetic resin.

4. The battery pack of claim 2, wherein the support frame has a connection hole in a surface thereof on which the horizontal support bars and the vertical support bars cross each other.

5. The battery pack of claim 1, wherein each of the first plate and second plates is made of copper (Cu).

* * * * *